Figure 1:
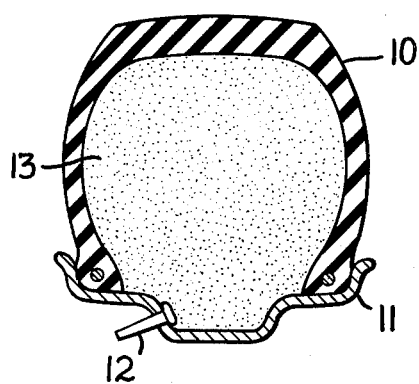

United States Patent [19]

Hagenbohmer et al.

[11] 4,037,636
[45] July 26, 1977

[54] SAFETY PNEUMATIC TIRE

[75] Inventors: Bodo Hagenböhmer; Philipp Schaefer, both of Hannover, Germany

[73] Assignee: Michelin Recherche et Technique, Switzerland

[21] Appl. No.: 648,014

[22] Filed: Jan. 12, 1976

[30] Foreign Application Priority Data

Jan. 14, 1975 Germany .......................... 2501188
Nov. 4, 1975 Germany .......................... 2549239

[51] Int. Cl.² .................... B60C 21/08; B60C 17/00
[52] U.S. Cl. .................................... 152/347; 152/310
[58] Field of Search .......... 152/346, 347, 348, 310–314

[56] References Cited

U.S. PATENT DOCUMENTS

| | | | |
|---|---|---|---|
| 1,439,197 | 12/1922 | Smith, Jr. ............................ | 152/313 |
| 3,022,810 | 2/1962 | Lambe .................................. | 152/313 |
| 3,042,098 | 7/1962 | Reinowski et al. .................. | 152/347 |
| 3,866,652 | 2/1975 | Ahmad ................................ | 152/310 |
| 3,921,689 | 11/1975 | Caccia et al. ....................... | 152/347 |

Primary Examiner—Drayton E. Hoffman
Attorney, Agent, or Firm—Brumbaugh, Graves, Donohue & Raymond

[57] ABSTRACT

Tires are improved against puncture damage by at least partially filling the inside of the tire with hollow spheres which contain a gas and whose thin shell consists of synthetic material, these spheres having a diameter of between 0.01 and 0.04 mm. and a density of 0.005 to 0.25 g/cc., and/or by lining at least a portion of the surface of the inner wall of the tire with a strip of composite material of low density comprising a suspension of said hollow spheres in a mass of liquid or pasty synthetic material of low molecular weight.

28 Claims, 3 Drawing Figures

SAFETY PNEUMATIC TIRE

The present invention relates to a tire and more particularly to a filling material intended to prevent the inflation fluid from escaping when the tire has been punctured or to prevent said fluid from escaping to an extent which dangerously jeopardizes the road adhering properties and the load bearing capacity of the tire; the invention also relates to a tire provided with such material.

The drawbacks and dangers which a tire, which has been damaged in this manner, presents for the vehicle and its occupants are well known and numerous suggestions have already been made for the remedying thereof. It has, for instance, been proposed that the tire be subdivided into a plurality of air-filled compartments or that it be provided with a filling of synthetic material, cellular rubber, gas-containing balls, etc.

None of the solutions contemplated up to the present time has been able to gain acceptance, because they present too many drawbacks with respect to manufacture, with respect to normal travel of the tire, or with respect to travel after puncture or else after the tire has remained for a long time without traveling. Such drawbacks consist of the formation of excessive imbalance, and the disaggregating of the filling of synthetic material or cellular rubber under the prolonged action of the heat produced during driving.

In order to avoid the above drawbacks, the invention employs a material which is known per se in other applications and which consists of hollow spheres containing a gas and the thin shell of which consists of a synthetic material, for instance, polyvinylidene chloride, these hollow spheres having a diameter of between 0.01 and 0.4 mm., preferably between 0.02 and 0.1 mm., and a density of 0.005 to 0.25 g./cc., preferably between 0.015 and 0.08 g./cc.

It has been found that these known hollow spheres whose shell consists, for instance, of polyvinylidene chloride lend themselves particularly well to use in accordance with the invention due to their smooth surface, their low coefficient of friction, their ability to withstand high compressive forces and the large volume of gas which they contain. A description of such hollow spheres is to be found in an article entitled "Expandable Filler Catches On" appearing in the magazine "Modern Plastics", August 1969, pages 55-57.

The invention contemplates using these hollow spheres either in the form of a suspension in a gaseous continuous phase which at least partially fills the tire cavity (first embodiment of the invention), or in the form of a suspension in a liquid or semi-liquid continuous phase which can be adhered on at least the portion of the inner wall of the tire below the tread (second embodiment of the invention) or else in the form of a combination of these two suspensions (third embodiment of the invention). Due to the gaseous, liquid or semi-liquid (pasty) physical state of the continuous phases of the suspensions, the suspended hollow spheres therein are free to move relative to one another and thus be able to plug and to seal a puncture hole in the tire.

The friction can be decreased even more and the sliding improved, if, in accordance with the invention, small amounts by volume of liquid and/or solid lubricants are added, such as, for instance, silicone oil and/or zinc stearate or powdered graphite. An amount of 0.05 to 6.5% lubricant, referred to the volume of hollow spheres in the total filling, is generally sufficient.

As a result of the favorable ratio between the shell of synthetic material and the gaseous center, the hollow spheres which preferably comprise a very thin layer of lubricant on their outer surface behave like air contained in an airtight tire when they are subjected to compression.

It has been found that a quasi-suspension composed of the hollow spheres and air behaves practically exactly in the same manner as air when it is in such an airtight tire from which the air cannot escape.

When the tire in which these spheres are contained is punctured, the spheres are retained in the tire which, even after disappearance of the compressed air which it contained, behaves like a tire traveling under reduced pressure of inflation.

In accordance with the invention, the filling material may be composed exclusively of individual spheres, i.e., spheres which are separated from each other, or the spheres may be loosely connected together by means of a lubricant.

It is also possible within the scope of the invention to employ together with the spheres, that is to say in addition to them, other known tire filling materials, for instance, compressed air contained in an airtight rubber enclosure, or else freely movable solid particles of cellular material of very low apparent density, which possibly bear a lubricant having a low vapor pressure, as described in U.S. application Ser. No. 535,699, filed Dec. 23, 1974, now Pat. No. 4,003,419.

The compressed air and spheres may be introduced into the tire in any manner, for instance, by means of a valve or a trocar. The spheres are preferably introduced into the tire when the latter is mounted on its rim, whereupon the air is introduced so that the turbulence caused by the introduction of the latter forms the above-mentioned quasi-suspension.

The ratio of spheres to air results from practical requirements. A completed filling preferably comprises from 30 -98% by volume of spheres for a pressure of 0.01 to 5.8 bars within the tire.

It has been found that a known tire mounted on a rim and containing 55% by volume of spheres and 45% by volume of air compressed to 1.6 bar assured travel under optimum conditions of comfort and safety.

In case of variations in temperature a tire which contains a filling in accordance with the invention behaves in more constant fashion than a conventional tire. In particular when a small amount of powdered graphite is present as lubricant, the heat produced by the friction on the ground is better discharged to the rim than in the case of a conventional tire of a tire filled with cellular material.

The second embodiment of the invention is produced with hollow spheres which preferably have different diameters and are loosely connected to each other by liquid or pasty synthetic material and then fastened of the inner wall of the tire so that they can be detached therefrom, together with the synthetic material in which they are contained, under the action of an external force. In this second embodiment of the invention, we no longer have a suspension of spheres in air as in the first embodiment but rather we have a suspension of individual spheres of different diameters in a liquid or pasty synthetic material of low molecular weight.

The composite material thus formed is airtight and of low density, of the order of 0.05 to 0.60 g./cc. and preferably from 0.08 to 0.26 g./cc.; a relatively large quantity thereof can therefore be introduced into the tire without impairing its riding properties.

Due to the gas (which may be air) occluded within the hollow spheres and due to the fact that the liquid or pasty synthetic material of low molecular weight cannot migrate into the hollow spheres, the low density of the composite material in accordance with the invention continues to exist even after a lengthy period of severe service. The risk of this composite material accumulating at the bottom of the tire when stopped is thus also avoided.

The use of hollow spheres of different diameters in accordance with the second embodiment of the invention has two aspects:

1. the smaller spheres fill up the spaces between the larger spheres so that less liquid or pasty synthetic material of low molecular weight is required, which has a favorable effect on the density of the composite material;

2. under the action of the centrifugal force, the smaller spheres gradually collect on the inner wall of the tire and immediately and lastingly plug there any mechanical damage by infiltrating into the damaged point. The small particle size of the spheres (preferably 0.02 to 0.1 mm.) and their smooth outer surface favor their penetration into the damaged place. These spheres behave at the damaged place like a plug of soft rubber due to their elasticity under compression. They are not expelled out of the hole under the action of the centrifugal force, since they are of low density.

The invention is not limited to the polyvinylidene chloride spheres mentioned above; any hollow spheres containing a gas occluded within a thin envelope can be used. A description of suitable hollow spheres is to be found in the magazine "Kunststoffe," Volume 60, 1970, No. 1, pages 19 to 22.

In order to combine the spheres with each other and with the inner wall of the tire any liquid or pasty synthetic materials of low molecular weight of less than 7,500 can be used which have not attacked the thin layer of spheres within 172 hours of contact with the spheres at a temperature of $+65°$ C. Commerical copolyamides known under the trademark VERSAMID and a commercial polybutylene known under the trademark OPPANOL B. have proved to be particularly suitable.

In a preferred arrangement, the composite material which is adhered to the inner wall of the tire is first of all covered with a thin adherent protective layer on the face thereof opposite said wall.

For a tire which is subjected to normal stresses, it is generally sufficient to arrange the composite material in the tread region of the tire, since practically all damage occurs in this region.

For a tire for military vehicles a larger quantity is necessary, preferably in combination with a filling in accordance with the first embodiment of the invention, that is to say with a gaseous suspension of hollow spheres so that the side walls of the tire are also protected. This arrangement constitutes the third embodiment of the invention.

While in the second embodiment of the invention the hollow spheres act only to plug a hole thus preventing any substantial loss of inflation fluid from the tire, they play a twofold role in the first embodiment, namely, in the same manner as in the second embodiment, they rapidly plug the hole; furthermore, even if the inflation pressure of the tire has dropped substantially, the mass of these spheres with which the tire is at least partially filled contributes to supporting the load.

One method of manufacturing a tire provided with the composite material in accordance with the invention consists in distributing in any manner within the liquid or pasty synthetic material of low molecular weight, possibly together with other bodies, compact particles of synthetic material which contain an inflating agent and which will form the hollow spheres. This mixture is then heated to about 70° C. which causes the formation of hollow spheres; the filling material is then practically ready for use. Thereupon, a strip of filling material corresponding to the inner wall of the tire to be filled is formed out of said material by means of molding or extrusion, the strip being preferably engaged between two thin protective sheets. One of these sheets is withdrawn before applying the strip of material against the inner wall of the tire and pressure is applied to said strip in order to cause it to adhere to the said wall on the face thereof which does not bear a protective sheet. The tire can then be mounted on its rim and inflated as in the case of an ordinary tire.

It is also possible to produce the hollow spheres by heating the above mixture directly in the tire. A description of the formation of hollow spheres is to be found in the magazine "Modern Plastics", August, 1969, pages 55–57.

The invention will now be described in further detail on the basis of an example.

In a tubeless tire of size 175/70 SR 13, a strip of filling material in accordance with the invention was applied to the portion of the inner wall located below the tread. The protective sheet, which covered the face of said strip which was intended to adhere to said wall, had been first removed. The tire was then mounted on its standard rim, inflated with air to 1.9 bar and the assembly balanced. The wheel being fastened to the hub. The tire was punctured in a groove of its tread by means of a pointed tool having a diameter of 5 mm. which also punctured the strip of material having a thickness of about 5 mm., after which this tool was withdrawn. After traveling for 1,100 km., this tire was still capable of traveling at normal speed, whereas a tire containing only air and punctured with the same tool had become unusable at the end of 5 km. The tire which had been punctured the first time was then punctured at two other places of the tread, also in a groove. After traveling an additional 210 km. and being placed for 8 hours at 50° C. in a drying furnace, this tire was allowed to cool and its pressure measured; it wasfound to be 1.75 bar, namely, a minimum loss of 0.15 bar. The good traveling properties were not impaired by this heating.

Nonlimitative examples of each of the three embodiments of the invention mentioned above are shown in the drawing in which FIGS. 1 to 3 are radial cross sections through tires in accordance with the first, the second, and the third embodiments, respectively.

FIG. 1 shows a tire 10 mounted on a rim 11 which is provided with an inflation valve 12. This tire contains hollow spheres 13 in accordance with the invention which, before inflation of the tire by compressed air introduced through the valve 12, fill up about 95% of the inside volume of the tire.

Figure 2:
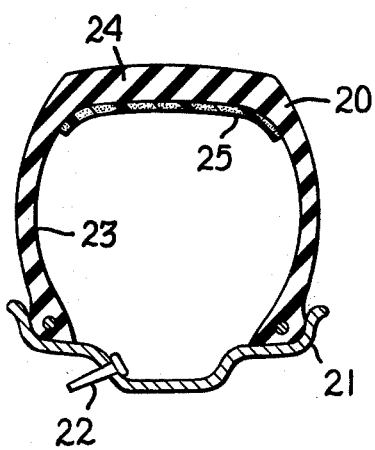

The tire 20 shown in FIG. 2, is mounted on a rim 21 provided with an inflation valve 22. The tire 20 has an inner wall 23. On the portion of this wall which is located below the tread 24 there is fastened by adherence a strip 25 of composite material in accordance with the invention. In a variant (not shown) this strip extends over the entire inner wall of the tire.

Figure 3:
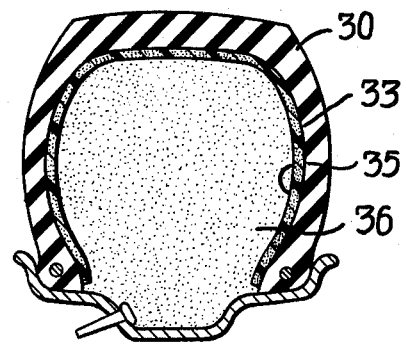

In the third embodiment of the invention, shown in FIG. 3, a strip 35 of composite material in accordance with the invention covers the entire inner wall 33 of the tire 30. Furthermore, this tire is filled with hollow spheres 36 in accordance with the invention in a quantity equal to 98% of its inner volume, this percentage of filling being measured before the inflation of the tire.

What is claimed is:

1. In a tire having an inner wall defining a tire cavity and containing a filling material for plugging punctures, the improvement which comprises said filling material being a suspension of hollow spheres, said suspension comprising a gaseous continuous phase containing freely movable suspended hollow spheres having thin shells consisting of synthetic material, said hollow spheres containing a gas in the centers thereof and having a diameter of from 0.01 to 0.4 millimeters and a density of from 0.005 to 0.25 g./cc., said suspension at least partially filling the tire cavity.

2. The tire defined by claim 1 wherein the shells of the hollow spheres consist of polyvinylidene chloride.

3. The tire defined by claim 1 wherein the hollow spheres are covered with a lubricant.

4. The tire defined by claim 1 wherein said suspension further contains freely movable solid particles of cellular material of very low apparent density.

5. The tire defined by claim 4 wherein said solid particles of cellular material bear a lubricant having a low vapor pressure.

6. The tire defined by claim 1 wherein said hollow spheres have a diameter of between 0.02 to 0.1 millimeters and a density of between 0.015 and 0.08 g./cc.

7. In a tire having an inner wall defining a tire cavity and containing a filling material for plugging punctures, the improvement which comprises said filling material being a suspension of hollow spheres, and suspension comprising a liquid to pasty continuous phase of synthetic material of low molecular weight containing freely movable suspended hollow spheres having thin shells consisting of synthetic material, said hollow spheres containing a gas in the centers thereof and having a diameter of from 0.01 to 0.4 millimeters and a density of from 0.005 to 0.25 g./cc., said suspension being adhered on at least the portion of the inner wall of the tire below the tread.

8. The tire defined by claim 7 wherein the shells of the hollow spheres consist of polyvinylidene chloride.

9. The tire defined by claim 7 wherein said suspension has a low density of from 0.05 to 0.60 g./cc.

10. The tire defined by claim 9 wherein said suspension has a low density of from 0.08 to 0.26 g./cc.

11. The tire defined by claim 7 wherein said suspension is in the form of a strip having its nonadhered face covered with a protective sheet.

12. The tire defined by claim 7 wherein the liquid to pasty synthetic material of low molecular weight has a molecular weight of less than 7,500.

13. The tire defined by claim 7 wherein the liquid to pasty synthetic material of low molecular weight is a copolyamide.

14. The tire defined by claim 7 wherein the liquid to pasty synthetic material of low molecular weight is a polybutylene.

15. The tire defined by claim 7 wherein said suspension further contains freely movable solid particles of cellular material of very low apparent density.

16. The tire defined by claim 7 wherein said hollow spheres have a diameter of between 0.02 and 0.1 millimeters and a density of between 0.015 and 0.08 g./cc.

17. In a tire having an inner wall defining a tire cavity and containing a filling material for plugging punctures, the improvement which comprises said filling material being a combination of a first and a second suspension of hollow spheres, said first suspension comprising a gaseous continuous phase containing freely movable suspended hollow spheres having thin shells consisting of synthetic material, said hollow spheres containing a gas in the centers thereof and having a diameter of from 0.01 to 0.4 millimeters and a density of from 0.005 to 0.25 g./cc., said first suspension at least partially filling the tire cavity; and said second suspension comprising liquid to pasty continuous phase of synthetic material of low molecular weight containing freely movable suspended hollow spheres having thin shells consisting of synthetic material, said hollow spheres containing a gas in the centers thereof and having a diameter of from 0.01 to 0.4 millimeters and a density of from 0.005 to 0.25 g./cc., said second suspension being adhered on at least the portion of the inner wall of the tire below the tread.

18. The tire defined by claim 17 wherein the shells of the hollow spheres in said first and second suspensions consist of polyvinylidene chloride.

19. The tire defined by claim 17 wherein the hollow spheres in said first suspension are covered with a lubricant.

20. The tire defined by claim 17 wherein said second suspension has a low density of from 0.05 to 0.60 g./cc.

21. The tire defined by claim 20 wherein said second suspension has a low density of from 0.08 to 0.26 g./cc.

22. The tire defined by claim 17 wherein said second suspension is in the form of a strip having its nonadhered face covered with a protective sheet.

23. The tire defined by claim 17 wherein the liquid to pasty synthetic material of low molecular weight has a molecular weight of less than 7,500.

24. The tire defined by claim 17 wherein the liquid to pasty synthetic material of low molecular weight is a copolyamide.

25. The tire defined by claim 17 wherein the liquid to pasty synthetic material of low molecular weight is a polybutylene.

26. The tire defined by claim 17 wherein said first and second suspensions further contain free movable solid particles of cellular material of very low apparent density.

27. The tire defined by claim 26 wherein said solid particles of cellular material bear a lubricant having a low vapor pressure.

28. The tire defined by claim 17 wherein said hollow spheres in said first and second suspensions have a diameter of between 0.02 and 0.1 millimeters and a density of between 0.015 and 0.08 g./cc.

* * * * *

UNITED STATES PATENT AND TRADEMARK OFFICE
CERTIFICATE OF CORRECTION

PATENT NO. : 4,037,636
DATED : July 26, 1977
INVENTOR(S) : Bodo Hagenbohmer et al It is certified that error appears in the above-identified patent and that said Letters Patent are hereby corrected as shown below:

Col. 2, line 52, "of a tire" should be -- or a tire --; line 57, "fastened of" should be -- fastened to --. Col. 4, line 19, before "wall" insert -- inner --; line 26, before "magazine" insert -- above-mentioned --; line 37, delete "being" and insert -- was then --; line 50, "wasfound" should be -- was found --; line 64, after "20" insert a comma (,); line 64, after "rim 21" insert -- which is --. Col. 5, line 39, "and suspension" should be -- said suspension --. Col. 6, line 21, after "comprising" insert -- a --.

Signed and Sealed this

Seventeenth Day of January 1978

[SEAL]

Attest:

RUTH C. MASON
Attesting Officer

LUTRELLE F. PARKER
Acting Commissioner of Patents and Trademarks